Figure 1:
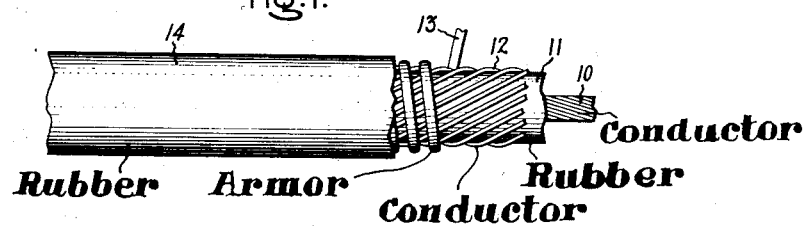

Oct. 18, 1938.　　　H. G. KNODERER　　　2,133,863

ELECTRIC CABLE

Filed June 19, 1935

Inventor:
Homer G. Knoderer,
by Harry E. Dunham
His Attorney.

Patented Oct. 18, 1938

2,133,863

UNITED STATES PATENT OFFICE 2,133,863

ELECTRIC CABLE

Homer G. Knoderer, Fairfield, Conn., assignor to General Electric Company, a corporation of New York Application June 19, 1935, Serial No. 27,362

3 Claims. (Cl. 173—266)

My invention relates to electric cable and more particularly to an electric cable of the armored type.

For many years armored cable has been used in the wiring of buildings consisting of a plurality of insulated conductors covered with a heavy interlocked armor. These cables are connected to the distribution system which in general consists of two conductors connected to the opposite terminals of a distribution transformer and a third conductor connected to an intermediate point of the secondary winding. This third conductor is generally connected to ground and the cables supplying the current to the building are connected to one of the first mentioned conductors and the third conductor. The armor provided on the cables is generally connected to ground at or near the point of the connection of the cable to the supply source for the house. If at any time the insulation on any of the conductors in the armored cable should be impaired the conductor may come in contact with the metal armor. If the conductor contacting the armor should be the one connected to the conductor which is grounded no serious difficulties would ensue. However, if the other conductor connected to an ungrounded conductor should come in contact with the armor a short circuit would occur with the short circuit current flowing through the armor. Due to the high resistance of the metal normally used for armoring, the heating due to the short circuit might be considerable and in many instances has been sufficient to result in a fire. As a result of these difficulties with armored cable, a considerable tendency has occurred in recent years to use a so-called non-metallic sheathed cable for house wiring which is not provided with any metal armor at all. While this cable overcomes any danger of fire due to a flow of current through a metal armor of high resistance, it is not entirely satisfactory because of its lack of sufficient mechanical protection to insure against damage to the cable. Such damage frequently occurs upon alterations to the house by the driving of a nail which passes through the non-metallic sheath and contacts with one or more of the conductors of the cable either producing an immediate short circuit or resulting in a subsequent short circuit with deterioration of the insulation on the conductors. To overcome the objection to the use of non-metallic sheathed cable and armored cable as formerly used in house wiring, it has been proposed to use an uninsulated conductor combined with one or more insulated conductors in an armored cable with the uninsulated conductor in contact with the armor throughout its length. The uninsulated conductor insures a low resistance path for any short circuit currents and thus reduces the fire hazard from this source. However, objection has been made to this type of cable because of the possibility of leakage currents along water pipes and gas pipes through contact with the armor of such cable. It has been found that houses wired with such cable frequently have considerable leakage currents. Such leakage currents may result in corrosion of the pipes at joints or at points where the leakage currents leave the pipe. In addition, there is some danger of fire or explosions due to the leakage current producing sparks in the vicinity of oil or gas frequently used in houses. To overcome these difficulties I propose to provide an improved cable of the armored type which will incorporate the advantages of the armored cable with a bare conductor with respect to danger of heating of the metal armor and yet will avoid the hazard of leakage currents along water pipes, gas pipes and the like. In addition, my improved cable is of low cost of manufacture and is easy to install.

Figure 2:
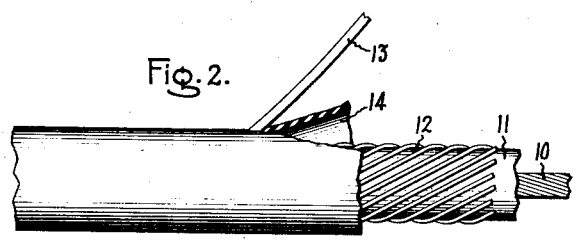

What I consider to be novel and my invention will be better understood by reference to the following specification and appended claims when considered in connection with the accompanying drawing in which Fig. 1 is a plan view of my improved cable with adjacent elements cut away to disclose the elements beneath; Fig. 2 is a similar view with a portion of the armor removed and the outer covering severed.

Referring to the drawing, 10 indicates a stranded conductor, 11 a covering of insulation for the conductor which may consist of rubber with a braid or other suitable insulating material. While a single insulated conductor is provided in the cable as illustrated in the drawing obviously a plurality of insulated conductors may be provided if desired. Over conductor 10 and insulation 11 a bare conductor 12 is provided consisting of strands spaced uniformly around the surface of insulation 11 and wound spirally with a long pitch spiral. Over conductor 12 an armor 13 is provided consisting of a strip of metal wound with a short pitch spiral with spaced convolutions in direct contact with the conductor 12. Over the armor 13 a layer 14 of insulating material is provided which preferably consists of an elastic material such as rubber which will serve to insulate the conductors 12 and armor 13 from any pipes or metal surfaces which the cable may contact upon its installation in a building.

As better indicated in Fig. 2, when it is desired to connect the cable to a supply conductor or to a wiring device such as a receptacle switch or the like, the outer covering 14 of insulating material may easily be removed by unwinding the armor 13 to the extent necessary to expose the portion of conductor 12 desired by merely pulling the end of armor 13. This may be accomplished due to the elasticity of the covering 14. Then the armored strip 13 is pulled rearwardly to sever covering 14 extending over the part of conductor 12 from which the armor 13 has been removed. The slitted portion of covering 14 may then be readily removed and the end of armor strip 13 cut. The end of conductor 12 may then be unwound from the insulated conductor 10 and connected to the grounded conductor of the supply circuit or to one terminal of the wiring device. The insulation 11 is removed from the end of conductor 10 after which conductor 10 may be connected to an ungrounded conductor of the supply circuit or to another terminal of a wiring device.

The covering 14 can most conveniently be made of rubber extruded over the armored cable and thereafter vulcanized but any other covering of insulating material may be substituted which is formed sufficiently loose about the armor or is flexible to permit the unwinding of the armor beneath it and the severance of the covering by the drawing backward of the armor strip. The covering 14 may be very thin as its insulating properties are not particularly important because the potential difference between conductor 12, armor 13 and any grounded pipe or metal surface that may be contacted will not be great but it is only necessary to prevent any leakage current from flowing over a relatively high resistance circuit in parallel with the low resistance circuit of conductor 12 and armor 13.

From the foregoing it may be seen that a cable is provided which incorporates the advantage of a bare grounded conductor in contact with a metal armor throughout its length and an insulating covering to prevent leakage current through contact of the grounded metal armor with metal pipes and other devices located in the building and at the same time may be readily connected to the supply source or wiring device as desired. In addition the cable is of such simplified construction that it may be made of relatively small overall diameter and may be manufactured at a relatively low cost.

What I claim as new and desire to secure by Letters Patent of the United States is:

1. In an electric cable, a conductor, an armor comprising a strand wound around said conductor with a short pitch spiral having spaced convolutions and a thin elastic insulating covering surrounding said armor and conductor, said covering being of such elasticity that the spaced convolutions of said armor may be pulled from beneath said covering and unwound for a substantial length and said covering being of such thickness that it may be severed by the unwound portion of said armor upon pulling said armor back longitudinally of the cable.

2. In an electric cable, a conductor, an armor comprising a strand wound around said conductor with a short pitch spiral and a thin insulating covering overlying said armor, said covering being loosely placed around said armor so that a substantial length of said armor may be unwound by pulling adjacent convolutions of said short pitch spiral from beneath said covering and said covering being of such thickness that it may be severed by pulling back said unwound portion of said armor longitudinally of said cable.

3. In an electric cable, an inner conductor, a layer of insulating material overlying said inner conductor, an outer conductor comprising spaced strands wound with a long pitch spiral over said insulating material, an armor comprising a metallic strand wound around said outer conductor with a short pitch spiral having adjacent convolutions, and an overall thin rubber covering surrounding said armor and conductors, said covering being of such elasticity that the adjacent convolutions of said armor may be pulled from beneath said covering and unwound for a substantial length, and said rubber covering being of such thickness that it may be severed by pulling back the unwound portion of said armor longitudinally of the cable.

HOMER G. KNODERER.